(12) United States Patent
Zuraski, Jr. et al.

(10) Patent No.: US 7,389,402 B2
(45) Date of Patent: Jun. 17, 2008

(54) MICROPROCESSOR INCLUDING A CONFIGURABLE TRANSLATION LOOKASIDE BUFFER

(75) Inventors: Gerald D. Zuraski, Jr., Austin, TX (US); Swamy Punyamurtula, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 394 days.

(21) Appl. No.: 11/146,863

(22) Filed: Jun. 7, 2005

(65) Prior Publication Data

US 2006/0277390 A1 Dec. 7, 2006

(51) Int. Cl.
*G06F 12/00* (2006.01)
(52) U.S. Cl. .................. 711/205; 711/206; 711/207
(58) Field of Classification Search ............... None
See application file for complete search history.

(56) References Cited

U.S. PATENT DOCUMENTS

| | | | |
|---|---|---|---|
| 5,752,275 A | 5/1998 | Hammond | |
| 6,826,670 B2 * | 11/2004 | Middleton et al. | 711/205 |
| 2005/0021925 A1 | 1/2005 | Clark | |
| 2006/0161758 A1 | 7/2006 | Bradford et al. | |
| 2006/0206686 A1 | 9/2006 | Banerjee et al. | |

OTHER PUBLICATIONS

International Search Report in Application No. PCT/US2006/019942 Mailed Feb. 2, 2007.
Austin, T.M. et al., Institute of Electrical and Electronics Engineers Association For Computing Machinery: "High-Bandwidth Address Translation For Multiple-Issue Processors", Proceedings of the 23rd Annual Symposium on Computer Architecture, New York, ACM/IEEE, US, vol. Symp.23, May 22, 1996, pp. 158-167.

* cited by examiner

*Primary Examiner*—Reginald Bragdon
*Assistant Examiner*—Ngoc Dinh
(74) *Attorney, Agent, or Firm*—Meyertons Hood Kivlin Kowert & Goetzel, P.C.; Stephen J. Curran (57) ABSTRACT

A translation lookaside buffer may include control functionality coupled to a first storage and a second storage. The first storage includes a first plurality of entries for storing address translations corresponding to a plurality of page sizes. The second storage includes a second plurality of entries for storing address translations corresponding to the plurality of page sizes. In response to receiving a first address translation associated with a first page size, the control functionality may allocate the first plurality of entries to store address translations corresponding to the first page size. In addition, in response to receiving a request including an address that matches an address translation stored within the first storage, the control functionality may copy a matching address translation from the first storage to the second storage.

25 Claims, 4 Drawing Sheets

MICROPROCESSOR INCLUDING A CONFIGURABLE TRANSLATION LOOKASIDE BUFFER

BACKGROUND OF THE INVENTION

1. Field of the Invention

This invention relates to microprocessors, and more particularly, to translation lookaside buffers used for storing address translations.

2. Description of the Related Art

Many modern microprocessors support a form of virtual memory called "paging". Paging enables system software to create separate address spaces for each process or application. Paging divides a physical address space, defined by the number of address signals generated by the processor, into fixed-sized blocks of contiguous memory called "pages". If paging is enabled, a "virtual" address is translated or "mapped" to a physical address. Various mechanisms exist in different processor architectures for performing virtual-to-physical address translations. For example, in a processor implemented in the x86 architecture, with paging enabled a paging mechanism within the processor translates a virtual or "linear" address to a physical address. If an accessed page is not located within the system memory, paging support constructs (e.g., operating system software) load the accessed page from secondary memory (e.g., disk drive) into system memory. In some x86 processors, a set of hierarchical translation tables or "page tables," stored within the system memory, are used to store information needed by the paging mechanism to perform the virtual-to-physical address translations.

Since accesses to the system memory require relatively large amounts of time, address translations may be a source of processing latency. To reduce the number of required system memory accesses to retrieve information from page tables, a small cache memory system called a translation lookaside buffer (TLB) is typically used to store the most recently used address translations. Typically, translations are provided on a page basis (e.g. 4 kilobytes, 2 megabytes, etc.) and the TLB may store the page portion of the virtual address and the page portion of the corresponding physical address. The TLB may then be searched for the issued virtual address. If found, a physical address corresponding to the issued virtual address may then be used to access system memory. As the amount of time required to access an address translation in the TLB is relatively small, overall processor performance may be increased as needed address translations are often found in the readily accessible TLB.

Despite the advantages provided by a TLB, there may still be drawbacks. Some processor microarchitectures, such as in a superscalar processor, for example, may include multiple pipelines. To obtain high performance from such designs, low latency access to relatively large TLB structures may be desirable. To provide the low latency to the multiple pipelines, some conventional TLB structures may include several large multiported structures. In addition, multiple page sizes may be supported, and each TLB structure may support a different page size. Alternatively, very large fully associative TLB structures may support multiple page sizes. However, such conventional TLB designs may not only take up considerable area on the integrated circuit and have higher access times, but they may also consume an unacceptable amount of power.

SUMMARY

Various embodiments of a dynamically configurable translation lookaside buffer are disclosed. In one embodiment, a translation lookaside buffer may include control functionality coupled to a first storage and a second storage. The first storage includes a first plurality of entries for storing address translations corresponding to a plurality of page sizes such as 4 KB, 2 MB and 1 GB pages, for example. The second storage includes a second plurality of entries for storing address translations corresponding to the plurality of page sizes. In response to receiving a first address translation associated with a first page size, the control functionality may allocate the first plurality of entries to store address translations corresponding to the first page size. In addition, in response to receiving a request including an address that matches an address translation stored within the first storage, the control functionality may copy a matching address translation from the first storage to the second storage.

In one specific implementation, in response to receiving a subsequent address translation associated with a second page size, the control functionality may allocate a portion of the first plurality of entries to store address translations corresponding to the second page size.

In another specific implementation, in response to receiving a further address translation associated with a third page size, the control functionality may allocate a second portion of the first plurality of entries to store address translations corresponding to the third page size.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION

Figure 1:
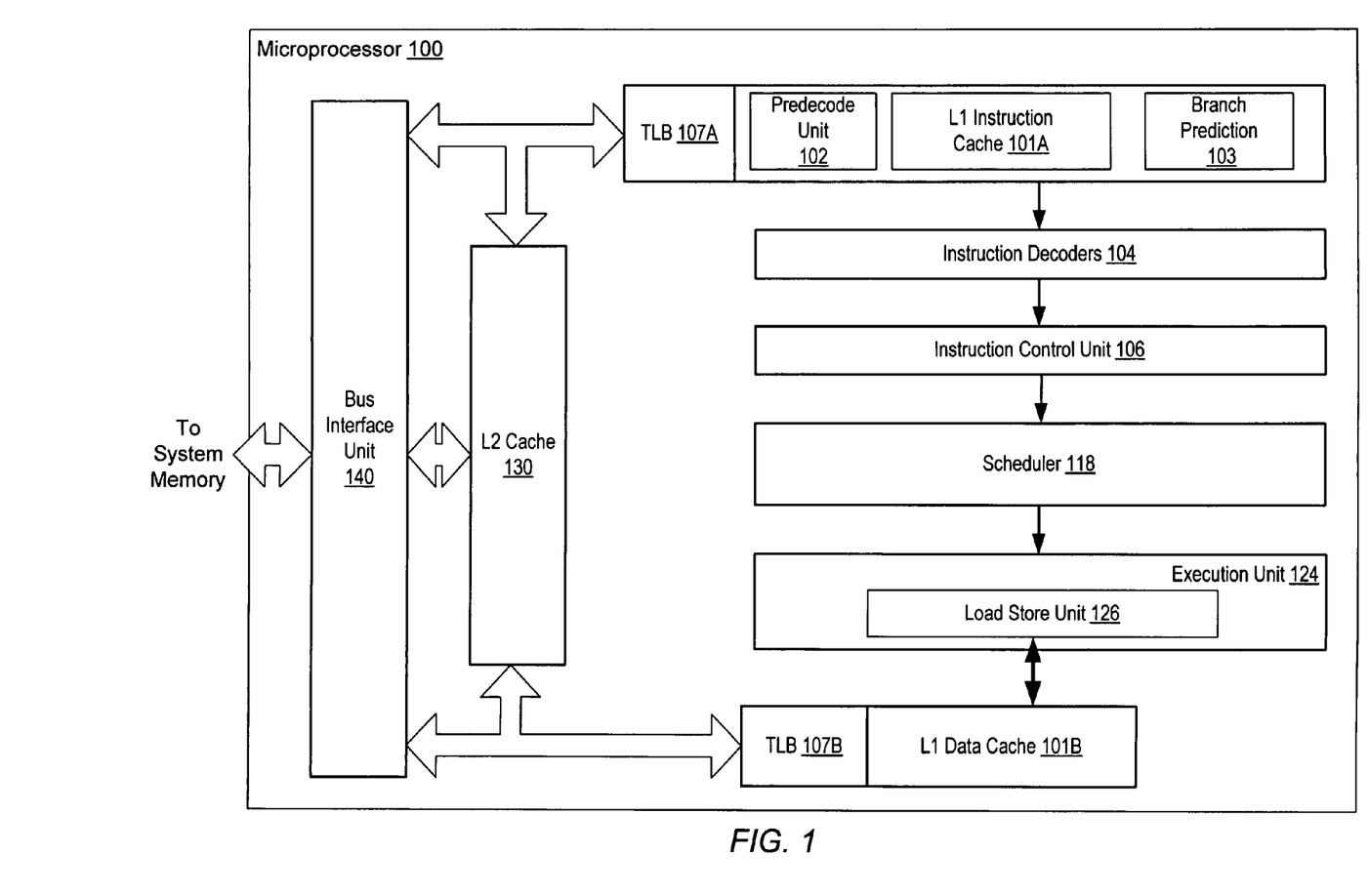
FIG. 1 is a block diagram of one embodiment of a microprocessor.

Turning now to FIG. 1, a block diagram of one embodiment of an exemplary microprocessor 100 is shown. Microprocessor 100 is configured to execute instructions stored in a system memory (not shown in FIG. 1). Many of these instructions may operate on data also stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes cache system including a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache 101 where appropriate. Microprocessor 100 also includes a pre-decode unit 102 and branch prediction logic 103 which may be closely coupled with instruction cache 101A. Microprocessor 100 also includes an instruction decoder 104, which is coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Further, microprocessor 100 includes an on-chip L2 cache 130 which is coupled between instruction cache 101A, data cache 101B and the system memory. It is noted that alternative embodiments are contemplated in which L2 cache memory 130 resides off-chip.

Instruction cache 101A may store instructions before execution. Functions which may be associated with instruction cache 101A may be instruction fetches (reads), instruction pre-fetching, instruction pre-decoding, and branch prediction. Instruction code may be provided to instruction cache 101A by pre-fetching code from the system memory through buffer interface unit 140 or from L2 cache 130. Instruction cache 101A may be implemented in various configurations (e.g., set-associative, fully-associative, or direct-mapped). In one embodiment, instruction cache 101A may be configured to store a plurality of cache lines where the number of bytes within a given cache line of instruction cache 101A is implementation specific. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to execution unit 124. In one embodiment, instruction control unit 106 may include a reorder buffer (not shown) for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler 118 may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units (e.g., an address generation unit (AGU)) may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. In one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory and it may be configured to store instructions and/or data. In the illustrated embodiment, L2 cache 130 is an on-chip cache and may be configured as either fully associative or set associative or a combination of both. In one embodiment, L2 cache 130 may store a plurality of cache lines where the number of bytes within a given cache line of L2 cache 130 is implementation specific. It is noted that L2 cache 130 may include control circuitry (not shown in FIG. 1) for scheduling requests, controlling cache line fills and replacements, and coherency, for example.

Bus interface unit 140 may be configured to transfer instructions and data between system memory and L2 cache 130 and between system memory and L1 instruction cache 101A and L1 data cache 101B. In one embodiment, bus interface unit 140 may include buffers (not shown) for buffering write transactions during write cycle streamlining.

In one particular embodiment of microprocessor 100 employing the x86 processor architecture, instruction cache 101A and data cache 101B may be physically addressed. As described above, the virtual addresses may optionally be translated to physical addresses for accessing system memory. The virtual-to-physical address translation is specified by the paging portion of the x86 address translation mechanism. The physical address may be compared to the physical tags to determine a hit/miss status. To reduce latencies associated with address translations, the address translations may be stored within a translation lookaside buffer (TLB) such as TLB 107A and TLB 107B.

In the illustrated embodiment, TLB 107A is coupled to instruction cache 101A for storing the most recently used virtual-to-physical address translations associated with instruction cache 101A. Similarly TLB 107B is coupled to data cache 101B for storing the most recently used virtual-to-physical address translations associated with data cache 101B. It is noted that although TLB 107A and 107B are shown as separate TLB structures, in other embodiments they may be implemented as a single TLB structure 107.

As will be described in greater detail below in conjunction with the description of FIG. 2 and FIG. 3, in one embodiment, TLB structure 107 may employ two independently configurable storages to store translations of different page sizes. TLB 107 may also include control functionality (not shown in FIG. 1) that may allocate the entries in a first storage dependent upon the page sizes of translations it receives. In addition, the control functionality may copy a given address translation from the first storage to a second storage in response to receiving an operation (such as a read operation) including an address that matches or "hits on" an address translation stored within the first storage, but "misses on" the address translations stored in the second storage. Further, TLB structure 107 may give preference to older operations when two or more operations are received by TLB 107 by allowing the older operation to access both storages.

Figure 2:
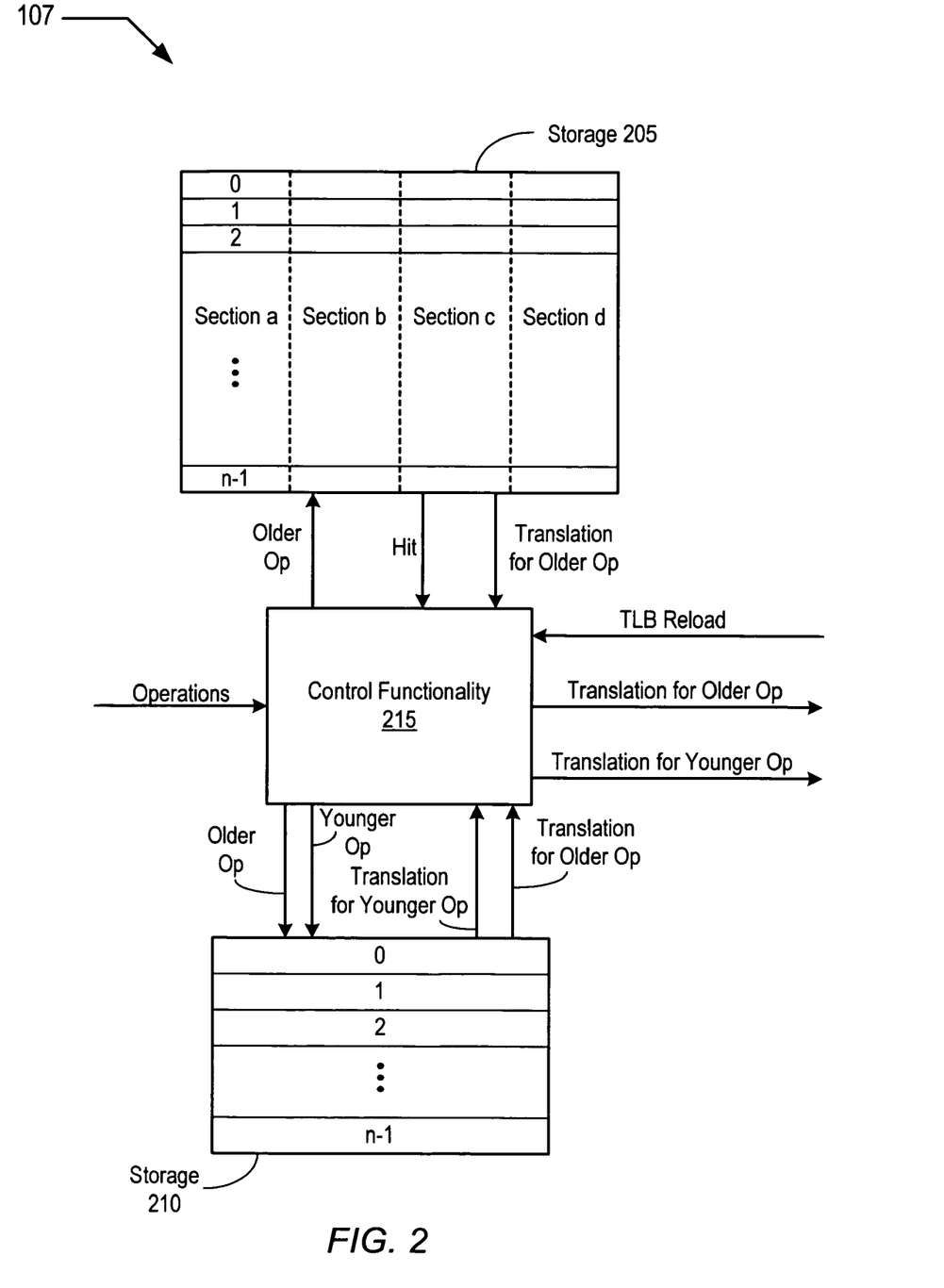
FIG. 2 is a block diagram of one embodiment of a translation lookaside buffer.

Referring to FIG. 2, a block diagram of one embodiment of a TLB structure is shown. TLB 107 includes control functionality 215 coupled to a storage 205 and to a storage 210. Control functionality 215 is coupled to receive operations such as instruction or data fetch requests including a virtual address, for example, from the core logic of processor 100. It is noted that a number of address bits may be stored as tag bits within storage 205 and 210.

In the illustrated embodiment, storage 205 is a configurable storage that includes a number of entries designated 0 through n−1. Storage 205 may be divided into a number of independently accessible sections as denoted by the dashed lines. In one implementation, storage 205 may be divided into four different sections, designated section 'a' through section 'd', although in other embodiments storage 205 may be divided into any number of sections. The sections may be allocated to store address translations corresponding to different page sizes, as desired. In one embodiment, a storage entry may include all or a portion of the virtual address, the physical address and the corresponding page size of a translation. For example, in one specific implementation the page translation mechanism of processor 100 may support page sizes of 4 KB, 2 MB and 1 GB. However, other implementations are contemplated in which other page sizes may be supported. In one embodiment, control functionality 215 may dynamically configure storage 205 into a variety of storage configurations to simultaneously support the different page sizes depending on the page access pattern.

In the illustrated embodiment, storage 205 may be configured into one large storage, two smaller storages or three smaller storages. More particularly, storage 205 may be initialized such that all four sections and thus all entries within storage 205 may be allocated to store translations associated with one page size. Control functionality 215 may use the page size (e.g., 4 KB) associated with the first received operation (i.e., first address translation) to determine the page size allocation for the all entries of storage 205. Upon receiving a subsequent address translation that includes a different page size (e.g., 2 MB), control functionality 215 may dynamically reconfigure storage 205 by deallocating some sections and reallocating those sections to store translations having the new page size. Similarly, when a further translation that includes a third and different page size (e.g., 1 GB) is received, control functionality 215 may again dynamically reconfigure storage 205 by deallocating some sections and reallocating those sections to store translations having the third page size. It is noted that in one embodiment, at any given time, a given section of storage 205 may only store translations associated with one page size.

In one specific implementation, each of the sections of storage 205 may be implemented using a 256-entry, two-way set associative memory module. Each module may correspond to a random access memory (RAM) array. Accordingly, each section of storage 205 may be treated as a 256-entry bank (e.g., b0-b3). Banks b0 and b1, and banks b2 and b3 may be combined into two 512-entry superbanks (e.g., B0 and B1) as in the case of a four-way set associative storage. Thus as described further below in various configurations, storage 205 may be implemented as either a four-way set associative storage having two superbanks of 512 entries, or as a two-way set associative storage having four banks of 256 entries. It is noted that in other embodiments, each of the sections of storage 205 may be implemented using a different size memory module.

More particularly, in a first configuration, storage 205 may be configured for storing translations of one page size. In this configuration, storage 205 may be treated as either a four-way set associative storage having two superbanks of 512 entries, or as a two-way set associative storage having four banks of 256 entries.

In another configuration, storage 205 may be configured for storing translations of two different page sizes. In this configuration, storage 205 may still be treated as either a four-way set associative storage having two superbanks of 512 entries, or as a two-way set associative storage having four banks of 256 entries. For example, if a 4 KB page access is followed by a 2 MB page access, storage 205 may be configured as either.

In yet another configuration, storage 205 may be configured for storing translations of three different page sizes. In this configuration, storage 205 may still be treated as either a four-way set associative storage, or as a two-way set associative storage. Using a four-way set associative configuration, the banks may be allocated as follows: one superbank of 512 entries may be used for storing 4 KB translations, one bank of 256 entries for storing 2 MB translations and one bank of 256 entries for storing 1 GB translations. Using a two-way set associative configuration, the banks may be allocated as follows: two banks of 256 entries may be used for storing 4 KB translations, one bank of 256 entries for storing 2 MB translations and one bank of 256 entries for storing 1 GB translations.

Various exemplary configurations and bank allocations of storage 205 are illustrated in Table 1 below. Column one of Table 1 depicts page access patterns and columns two, three and four depict the bank allocations for the different access patterns. For example, the first entry in row 1 is 4K, which represents 4 KB page accesses. Thus, in row 1, column two, all banks are allocated to 4 KB pages. Likewise, the second entry of row one, column one is 4K2M, which represents a 4 KB access followed by a 2 MB access. Thus in row 1, column three, banks b0 and b1 are allocated to 4 KB pages, and banks b2 and b3 are allocated to 2 MB pages. The third entry of row one, column one is 4K2M1G, which represents a 4 KB access followed by a 2 MB access followed by a 1 GB access. Thus in row 1, column four, banks b0 and b1 are allocated to 4 KB pages, and bank b2 is allocated to 2M pages, and bank b3 is allocated to 1 GB pages. The remaining rows and columns are similarly allocated.

TABLE 1

Exemplary bank allocations for storage 205

| | b0, b1, b2, b3 | b0, b1, b2, b3 | b0, b1, b2, b3 |
|---|---|---|---|
| 4K, 4K2M, 4K2M1G | 4K, 4K, 4K, 4K | 4K, 4K, 2M, 2M | 4K, 4K, 2M, 1G |
| 4K, 4K1G, 4K1G2M | 4K, 4K, 4K, 4K | 4K, 4K, 1G, 1G | 4K, 4K, 2M, 1G |
| 2M, 2M4K, 2M4K1G | 2M, 2M, 2M, 2M | 4K, 4K, 2M, 2M | 4K, 4K, 2M, 1G |
| 2M, 2M1G, 2M1G4K | 2M, 2M, 2M, 2M | 2M, 1G, 2M, 1G | 4K, 4K, 2M, 1G |
| 1G, 1G2M, 1G2M4K | 1G, 1G, 1G, 1G | 2M, 1G, 2M, 1G | 4K, 4K, 2M, 1G |
| 1G, 1G4K, 1G4K2M | 1G, 1G, 1G, 1G | 4K, 4K, 1G, 1G | 4K, 4K, 2M, 1G |
| modules fired (2-way) | 1 | 2 | 3 |
| modules fired (4-way) | 2 | 3 | 4 |

Table 1 also illustrates how, depending on the number of ways that are used, the number of memory modules that need to be enabled (i.e., fired) may be reduced, thereby saving power. As shown in rows 8 and 9, using two-way set associativity may reduce the power consumed by TLB structure 107. More particularly, similar to some cache structure accesses, some of the received translation address bits may be used to match with translations stored in TLB structure 107. Accordingly, in one embodiment, only the memory modules in which a portion of an address matches may be enabled. In one embodiment, enabling or firing a module may include allowing the address bits to propagate to the RAM array.

In the illustrated embodiment, storage 210 is also a configurable storage that includes a number of entries designated 0 through n−1. In one embodiment, storage 210 may be configured such that each entry may store a translation for a different page size. In one specific implementation, storage 210 may be implemented as a 16-entry, fully associative storage where any entry may store any address implemented with a single RAM unit. When a large page translation is stored in an entry, any overlapping page translations may be invalidated.

Depending upon the specific implementation, control functionality 215 may receive any number of operations, each including an associated virtual address, from the core logic of microprocessor 100. In some embodiments of microprocessor 100, instructions may be executed out of program order, and some instructions may be rescheduled, thus in a superscalar design, some operations may be older than others. In addition, two or more operations may arrive substantially simultaneously. In an effort to allow older operations to progress through the pipelines, control functionality 215 may give preference to older operations by routing them to storage 205 and storage 210, while in most cases younger operations may be routed only to storage 210. Accordingly, the operations may be scheduled into TLB 107 based on the age of the operation.

In one embodiment, if an older operation matches or hits in the either of storage 205 or storage 210, control functionality 215 is coupled to provide the corresponding translation. If a younger operation hits in storage 210, in one embodiment, control functionality 215 may cause the translation to be provided directly from storage 210. However, if the younger and the older operations are requesting translations to the same page, in one implementation, although the younger operation may access storage 205, for performance, control functionality 215 may provide the address translation accessed by the older operation from storage 205.

As mentioned above, when control functionality 215 receives an operation that hits within storage 205 and misses within storage 210, in one embodiment, the address translation in storage 205 may be copied or written to an entry of storage 210. If no entries are available within storage 210, a translation already stored within storage 210 may be invalidated or overwritten based on a least recently used (LRU) algorithm. However, if the operation misses in storage 205, the virtual address may be translated by the page translation mechanism as described above and the translation may be written into storage 205 as a TLB reload. If the TLB reload will conflict with a read operation of TLB structure 107, in one embodiment, the translation for the TLB reload may be temporarily stored in a write buffer (not shown) within control functionality 215 and subsequently written into storage 205 at the next available opportunity, but before the next TLB reload.

In various embodiments, control functionality 215 may configure storage 205 to store the various page sizes in a programmable fashion. For example, in one embodiment, configuration functionality may rely upon values stored in configuration registers (not shown) to determine the various configurations. The configuration registers may be physically located anywhere within the microprocessor. In one embodiment, the configuration registers may be programmable via the operating system or via software under program control of the operating system, for example. In another embodiment, the configuration registers may be programmable via software executing from BIOS during boot-up.

Figure 3:
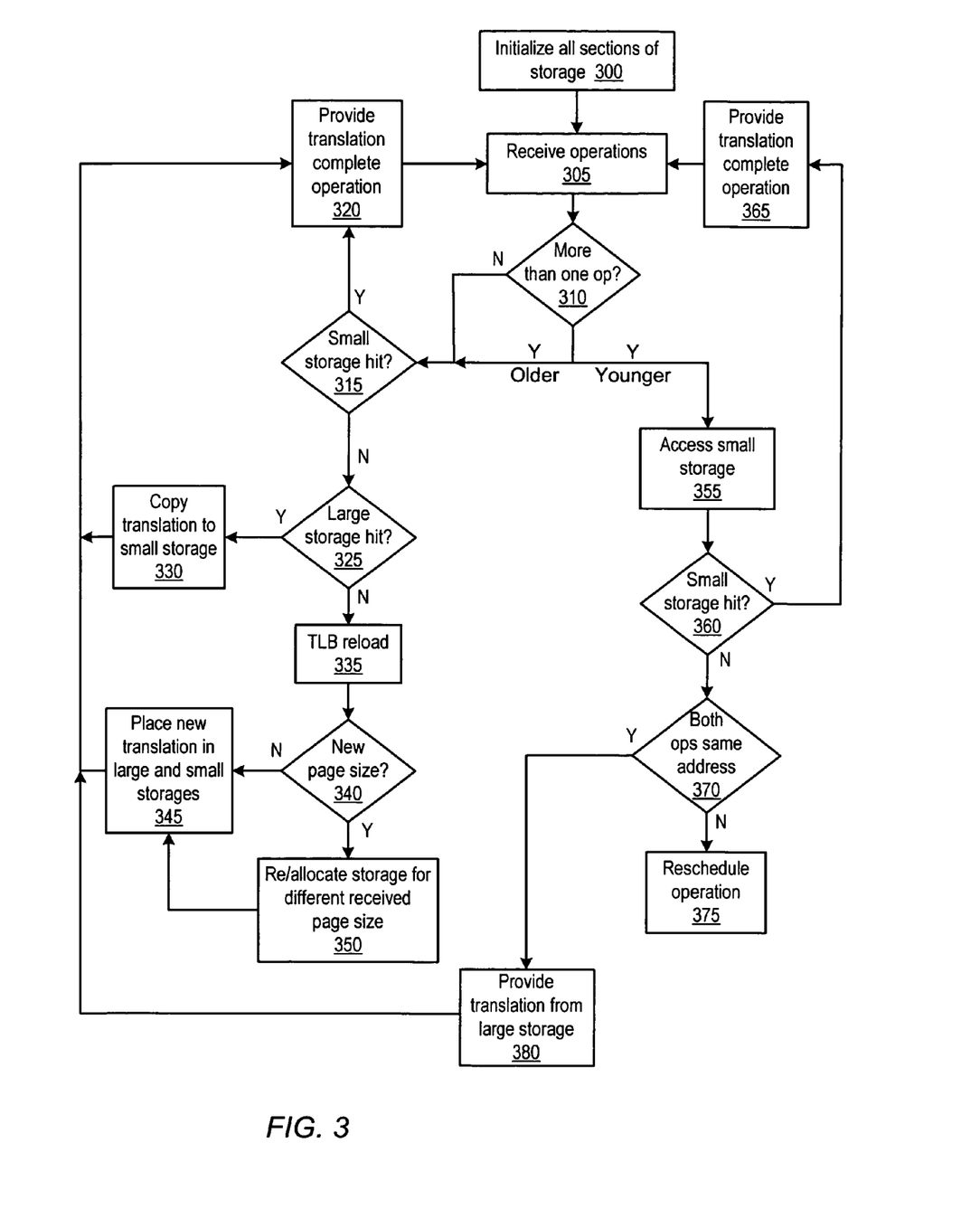
FIG. 3 is a flow diagram describing the operation of one embodiment of the translation lookaside buffer of FIG. 2.

FIG. 3 is a flow diagram describing the operation of one embodiment of the translation lookaside buffer structure of FIG. 2. Referring collectively to FIG. 1 through FIG. 3, control functionality 215 initializes all entries of storage 205 to store translations associated with the same page size (block 300). In block 305, control functionality 215 receives page access operations that include a virtual address (block 305). If there are more than one operation (block 310), control functionality 215 accesses storage 205 and storage 210 to look for a match for the older operation substantially simultaneously, and accesses storage 205 to look for a match for the younger operation. If there is only one operation, control functionality 215 treats the operation as an older operation and accesses storage 205 and storage 210 substantially simultaneously to look for a match. If there is a hit in storage 210 (block 315), control functionality 215 provides the corresponding address translation from storage 210 and completes the operation (block 320). However, if there is a miss in storage 210 (block 315), and there is a hit in storage 205 (block 325), control functionality 215 copies the corresponding address translation from storage 205 to storage 210 (block 330). Control functionality 215 may also provide the corresponding address translation from storage 210 to complete the operation (block 320).

Referring back to block 325, if there is a miss in storage 205, control functionality 215 may cause a TLB reload, in which the virtual address associated with the operation is translated by the page translation mechanism (block 335). Once the translation is complete, control functionality 215 determines if the page size of the returned address translation is a different size than any of the current page size allocations in storage 205 (block 340). If the page size of the address translation is not different, control functionality 215 stores the translation in storage 205 and storage 210 (block 345). However, if the page size is different than any of the current page size allocations in storage 205 (block 340), control functionality 215 reallocates or reconfigures storage 205 to store the different page sized address translation (block 350). For example, if the page size is 2 MB and storage 205 is configured entirely for 4 KB pages, control functionality 215 may reconfigure storage 205 as described above. Operation proceeds as described above in block 345. The entry within storage 210 that is used may be determined by an LRU algorithm.

Referring back to block 310, if there is more than one received operation, control functionality 215 accesses storage 210 to look for a match for the younger operation (block 355). If there is a hit within storage 210, control functionality 215 provides the corresponding address translation from storage 210 and completes the operation (block 365). However, if there is a miss in storage 210 (block 360), control functionality 215 checks to see if the younger and older operations have the same address (block 370). If the addresses are different, control functionality 215 may cause the operation to be rescheduled. However, if the addresses are the same (block 370), control functionality 215 provides the translation from storage 205 (block 380) and completes the operation (block 320).

Figure 4:
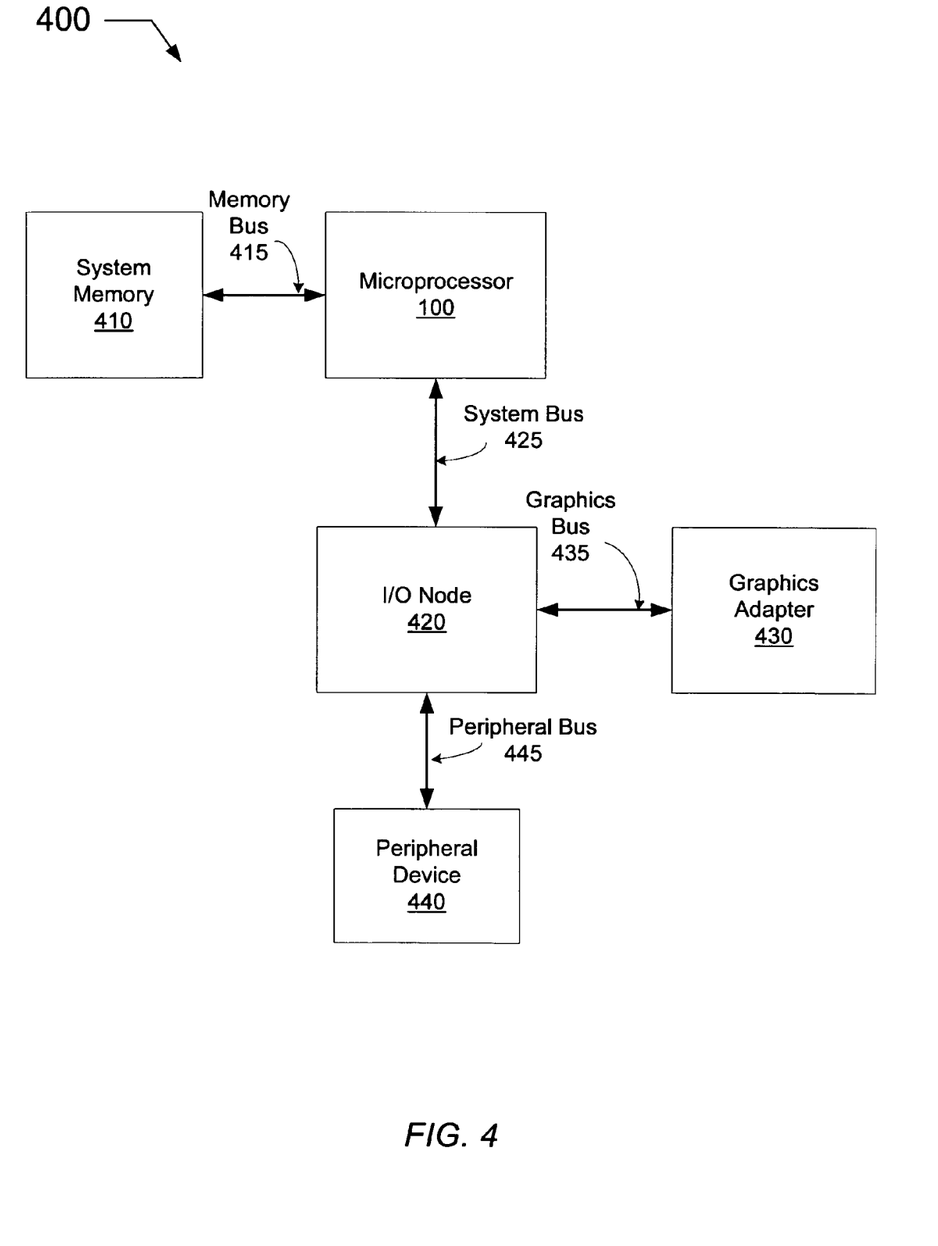
FIG. 4 is a block diagram of one embodiment of a computer system including the microprocessor of FIG. 1.

Turning to FIG. 4, a block diagram of one embodiment of a computer system 400 is shown. Components that correspond to those shown in FIG. 1 and FIG. 2 are numbered identically for clarity and simplicity. Computer system 400 includes microprocessor 100 coupled to a system memory 410 via a memory bus 415. Microprocessor 100 is further coupled to an I/O node 420 via a system bus 425. I/O node 420 is coupled to a graphics adapter 430 via a graphics bus 435. I/O node 420 is also coupled to a peripheral device 440 via a peripheral bus 445.

In the illustrated embodiment, microprocessor 100 is coupled directly to system memory 410 via memory bus 415. For controlling accesses to system memory 410, microprocessor may include a memory controller (not shown) within bus interface unit 140 of FIG. 1, for example. It is noted however that in other embodiments, system memory 410 may be coupled to microprocessor 100 through I/O node 420. In such an embodiment, I/O node 420 may include a memory controller (not shown). Further, in one embodiment, microprocessor 100 includes one or more TLB structures such as TLB 107 of FIG. 2, for example.

System memory 410 may include any suitable memory devices. For example, in one embodiment, system memory may include one or more banks of memory devices in the dynamic random access memory (DRAM) family of devices. Although it is contemplated that other embodiments may include other memory devices and configurations.

In the illustrated embodiment, I/O node 420 is coupled to a graphics bus 435, a peripheral bus 440 and a system bus 425. Accordingly, I/O node 420 may include a variety of bus interface logic (not shown) which may include buffers and control logic for managing the flow of transactions between the various buses. In one embodiment, system bus 425 may be a packet based interconnect compatible with the HyperTransport™ technology. In such an embodiment, I/O node 420 may be configured to handle packet transactions. In alternative embodiments, system bus 425 may be a typical shared bus architecture such as a front-side bus (FSB), for example.

Further, graphics bus 435 may be compatible with accelerated graphics port (AGP) bus technology. In one embodiment, graphics adapter 430 may be any of a variety of graphics devices configured to generate graphics images for display. Peripheral bus 445 may be an example of a common peripheral bus such as a peripheral component interconnect (PCI) bus, for example. Peripheral device 440 may any type of peripheral device such as a modem or sound card, for example.

It is noted that although the above embodiments include an older and a younger operation, it is contemplated that other embodiments may include any number of received operations. As such, control functionality 215 may be configured to receive and process more than two operations substantially simultaneously. For example, in one embodiment, storage 210 may have any number of ports, thereby enabling multiple younger operations to be processed with an oldest operation.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A translation lookaside buffer comprising:
   a first storage including a first plurality of entries for storing address translations corresponding to a plurality of page sizes;
   a second storage including a second plurality of entries for storing address translations corresponding to the plurality of page sizes; and
   control functionality coupled to the first storage and the second storage, wherein in response to receiving a first address translation associated with a first page size, the control functionality is configured to allocate the first plurality of entries to store address translations corresponding to the first page size;

wherein the control functionality is further configured to copy a matching address translation from the first storage to the second storage in response to receiving an operation including an address that matches an address translation stored within the first storage; and wherein, in response to receiving two operations substantially simultaneously, one older and one younger, the control functionality is configured to allow the older operation to access both the first storage and the second storage.

2. The translation lookaside buffer as recited in claim 1, wherein, in response to receiving a subsequent address translation associated with a second page size, the control functionality is further configured to dynamically allocate a portion of the first plurality of entries to store address translations corresponding to the second page size.

3. The translation lookaside buffer as recited in claim 2, wherein, in response to receiving a further address translation associated with a third page size, the control functionality is configured to dynamically allocate a second portion of the first plurality of entries to store address translations corresponding to the third page size.

4. The translation lookaside buffer as recited in claim 1, wherein, in response to receiving two operations substantially simultaneously, one older and one younger, the control functionality is configured to allow the younger operation to access the second storage.

5. The translation lookaside buffer as recited in claim 1, wherein, in response to receiving two operations substantially simultaneously, one older and one younger, and the operations are to a same page, the control functionality is configured to allow the younger operation to access the second storage and to provide an address translation corresponding to the same page that is stored within the first storage.

6. The translation lookaside buffer as recited in claim 1, wherein each entry of the second storage is configured to store address translations corresponding to any page size, wherein the second storage is fully associative.

7. The translation lookaside buffer as recited in claim 1, wherein the first storage is larger than the second storage.

8. The translation lookaside buffer as recited in claim 1, wherein the control functionality is further configured to copy the matching address translation from the first storage to the second storage if the received operation includes an address that matches an address translation stored within the first storage but does not match an address translation stored within the second storage.

9. The translation lookaside buffer as recited in claim 1, wherein the first storage includes a plurality of memory sections and wherein the control functionality is further configured to enable a given one or more of the plurality of memory sections in response to determining that a given address translation is stored in the given one or more of the plurality of memory sections.

10. A method of storing translations in a translation lookaside buffer, the method comprising:

storing address translations corresponding to a plurality of page sizes within a first storage including a first plurality of entries;

storing address translations corresponding to the plurality of page sizes within a second storage including a second plurality of entries;

in response to receiving a first address translation associated with a first page size, allocating the first plurality of entries to store address translations corresponding to the first page size;

copying a matching address translation from the first storage to the second storage in response to receiving an operation including an address that matches an address translation stored within the first storage; and in response to receiving two operations substantially simultaneously, one older and one younger, allowing the older operation to access both the first storage and the second storage.

11. The method as recited in claim 10, wherein, in response to receiving a subsequent address translation associated with a second page size, dynamically allocating a portion of the first plurality of entries to store address translations corresponding to the second page size.

12. The method as recited in claim 11, wherein, in response to receiving a further address translation associated with a third page size, dynamically allocating a second portion of the first plurality of entries to store address translations corresponding to the third page size.

13. The method as recited in claim 10, wherein, in response to receiving two operations substantially simultaneously, one older and one younger, allowing the younger operation to access the second storage.

14. The method as recited in claim 10, wherein, in response to receiving two operations substantially simultaneously, one older and one younger, and the operations are to a same page, allowing the younger operation to access the second storage and providing an address translation corresponding to the same page that is stored within the first storage.

15. The method as recited in claim 10, wherein each entry of the second storage is configured to store address translations corresponding to any page size, wherein the second storage is fully associative.

16. The method as recited in claim 10, wherein in response to receiving an operation including an address that matches an address translation stored within the first storage and does not match an address translation stored within the second storage, copying the matching address translation from the first storage to the second storage.

17. A microprocessor comprising:

one or more execution units configured to execute instructions;

a page translation mechanism coupled to the execution units and configured provide virtual-to-physical address translations; and a translation lookaside buffer coupled to the page translation mechanism, wherein the translation lookaside buffer includes:

a first storage including a first plurality of entries for storing address translations corresponding to a plurality of page sizes;

a second storage including a second plurality of entries for storing address translations corresponding to the plurality of page sizes; and control functionality coupled to the first storage and the second storage, wherein in response to receiving a first address translation associated with a first page size, the control functionality is configured to allocate the first plurality of entries to store address translations corresponding to the first page size;

wherein the control functionality is further configured to copy a matching address translation from the first storage to the second storage in response to receiving an operation including an address that matches an address translation stored within the first storage; and wherein, in response to receiving two operations substantially simultaneously, one older and one younger, the control functionality is configured to allow the older operation to access both the first storage and the second storage.

18. The microprocessor as recited in claim 17, wherein in response to receiving a subsequent address translation associated with a second page size, the control functionality is further configured to dynamically allocate a portion of the first plurality of entries to store address translations corresponding to the second page size.

19. The microprocessor as recited in claim 18, wherein, in response to receiving a further address translation associated with a third page size, the control functionality is configured to dynamically allocate a second portion of the first plurality of entries to store address translations corresponding to the third page size.

20. A microprocessor comprising:

one or more execution units configured to execute instructions;

a page translation mechanism coupled to the execution units and configured provide virtual-to-physical address translations; and a translation lookaside buffer coupled to the page translation mechanism, wherein the translation lookaside buffer includes:

a first storage including a first plurality of entries for storing address translations corresponding to a plurality of page sizes;

a second storage including a second plurality of entries for storing address translations corresponding to the plurality of page sizes; and control functionality coupled to the first storage and the second storage, wherein in response to receiving a first address translation associated with a first page size, the control functionality is configured to allocate the first plurality of entries to store address translations corresponding to the first page size;

wherein the control functionality is further configured to copy a matching address translation from the first storage to the second storage in response to receiving an operation including an address that matches an address translation stored within the first storage;

wherein, in response to receiving two operations substantially; and simultaneously, one older and one younger, the control functionality is configured to allow the younger operation to access the second storage.

21. The microprocessor as recited in claim 20, wherein in response to receiving a subsequent address translation associated with a second page size, the control functionality is further configured to dynamically allocate a portion of the first plurality of entries to store address translations corresponding to the second page size.

22. The microprocessor as recited in claim 21, wherein, in response to receiving a further address translation associated with a third page size, the control functionality is configured to dynamically allocate a second portion of the first plurality of entries to store address translations corresponding to the third page size.

23. A microprocessor comprising:

one or more execution units configured to execute instructions;

a page translation mechanism coupled to the execution units and configured provide virtual-to-physical address translations; and a translation lookaside buffer coupled to the page translation mechanism, wherein the translation lookaside buffer includes:

a first storage including a first plurality of entries for storing address translations corresponding to a plurality of page sizes;

a second storage including a second plurality of entries for storing address translations corresponding to the plurality of page sizes; and control functionality coupled to the first storage and the second storage, wherein in response to receiving a first address translation associated with a first page size, the control functionality is configured to allocate the first plurality of entries to store address translations corresponding to the first page size;

wherein the control functionality is further configured to copy a matching address translation from the first storage to the second storage in response to receiving an operation including an address that matches an address translation stored within the first storage;

wherein, in response to receiving two operations substantially simultaneously, one older and one younger, and the operations are to a same page, the control functionality is configured to allow the younger operation to access the second storage and to provide an address translation corresponding to the same page that is stored within the first storage.

24. The microprocessor as recited in claim 23, wherein in response to receiving a subsequent address translation associated with a second page size, the control functionality is further configured to dynamically allocate a portion of the first plurality of entries to store address translations corresponding to the second page size.

25. The microprocessor as recited in claim 24, wherein, in response to receiving a further address translation associated with a third page size, the control functionality is configured to dynamically allocate a second portion of the first plurality of entries to store address translations corresponding to the third page size.

* * * * *